United States Patent
Francisco et al.

(10) Patent No.: US 10,959,157 B2
(45) Date of Patent: Mar. 23, 2021

(54) SYSTEMS AND METHODS FOR WIRELESS COMMUNICATION NETWORK LOOP DETECTION

(71) Applicant: Hype Labs Inc., New York, NY (US)

(72) Inventors: André Francisco, Oporto (PT); Carlos Santos, Oporto (PT); Pedro Júlio, Braga (PT)

(73) Assignee: HYPE LABS INC., Wilmington, DE (US)

( * ) Notice: Subject to any disclaimer, the term of this patent is extended or adjusted under 35 U.S.C. 154(b) by 0 days.

(21) Appl. No.: 16/514,790

(22) Filed: Jul. 17, 2019

(65) Prior Publication Data

US 2020/0015146 A1    Jan. 9, 2020

Related U.S. Application Data

(63) Continuation of application No. 15/839,607, filed on Dec. 12, 2017, now abandoned.

(30) Foreign Application Priority Data

Aug. 17, 2017    (PT) .......................... 110258

(51) Int. Cl.
| | |
|---|---|
| *H04W 40/24* | (2009.01) |
| *H04L 12/705* | (2013.01) |
| *H04W 40/28* | (2009.01) |
| *H04W 40/02* | (2009.01) |
| *H04W 84/18* | (2009.01) |

(52) U.S. Cl.
CPC .......... *H04W 40/246* (2013.01); *H04L 45/18* (2013.01); *H04W 40/02* (2013.01); *H04W 40/28* (2013.01); *H04W 84/18* (2013.01)

(58) Field of Classification Search
None
See application file for complete search history.

(56) References Cited

U.S. PATENT DOCUMENTS

| | | |
|---|---|---|
| 6,603,740 B1 | 8/2003 | Du |
| 7,414,977 B2 | 8/2008 | Orlik et al. |
| 7,668,958 B2 | 2/2010 | Burr |
| | (Continued) | |

FOREIGN PATENT DOCUMENTS

| | | |
|---|---|---|
| CN | 102056163 B | 6/2013 |
| CN | 102137149 B | 11/2014 |
| | (Continued) | |

OTHER PUBLICATIONS

U.S. Appl. No. 15/839,607 Office Action dated Jan. 17, 2019.

*Primary Examiner* — Hong S Cho
(74) *Attorney, Agent, or Firm* — Leason Ellis LLP (57) ABSTRACT

A method for detecting communication loop in an ad hoc network is provided. The method may comprise: receiving, at a node of the ad hoc network, a message comprising a commutative value, wherein the node is associated with a node identifier and the commutative value pertains to node identifiers associated with one or more nodes along a path the message has been traversed along regardless of the order of the nodes; and determining, with aid of one or more processors, presence of a loop based on whether the commutative value is identical to a previously obtained commutative value.

20 Claims, 7 Drawing Sheets

(56) References Cited

U.S. PATENT DOCUMENTS

| | | | |
|---|---|---|---|
| 7,672,228 B1 * | 3/2010 | Senevirathne | H04L 41/046 370/219 |
| 7,889,655 B2 | 2/2011 | Retana et al. | |
| 8,014,299 B2 * | 9/2011 | van Bemmel | H04L 45/18 370/216 |
| 8,099,479 B2 | 1/2012 | Saint-Hilaire | |
| 8,107,382 B2 | 1/2012 | Lin et al. | |
| 8,238,288 B2 * | 8/2012 | Ahn | H04L 45/18 370/315 |
| 8,665,782 B2 | 3/2014 | Ylitalo et al. | |
| 8,672,566 B2 * | 3/2014 | Iwao | H04L 45/18 370/252 |
| 2003/0117966 A1 * | 6/2003 | Chen | H04L 45/46 370/255 |
| 2004/0240447 A1 | 12/2004 | Dorbolo et al. | |
| 2006/0262725 A1 | 11/2006 | Barrett | |
| 2011/0268013 A1 | 11/2011 | Levendel et al. | |
| 2019/0059041 A1 | 2/2019 | Francisco et al. | |

FOREIGN PATENT DOCUMENTS

| | | |
|---|---|---|
| EP | 1134939 A1 | 9/2001 |
| EP | 3051919 A1 | 8/2016 |

* cited by examiner

SYSTEMS AND METHODS FOR WIRELESS COMMUNICATION NETWORK LOOP DETECTION

CROSS-REFERENCE TO RELATED APPLICATIONS

This application is a Continuation Application of U.S. application Ser. No. 15/839,607, filed Dec. 12, 2017, which claims the priority and benefit of PT Provisional Application No. 110258 filed on Aug. 17, 2017, each of which is incorporated herein by reference in its entirety.

BACKGROUND

Wireless networks have become increasingly popular in a wide range of applications. Wireless networks include different types such as infra-structured network, ad-hoc network, or a combination of both. In Mobile Ad Hoc Networks (MANETs), one important issue is how to provide stable communication between nodes against transition of network state such as node mobility or quality transition of communication links.

In MANETs, due to the fragile nature of wireless links, routing protocols are designed to be resilient against failure, while restraining the network load of control messages even if nodes are distributed densely. For example, some proactive link-state routing algorithms utilize dynamic link metrics to find better quality paths. However, such protocols also increase the risk of message looping or duplication caused by the paths flapping.

Message looping is a harmful phenomenon in which messages are forwarded among the same nodes or along the same link repeatedly thus consuming significant capacity of the network or cause network congestion. Methods such as path-vector routing schemes or link-state routing schemes have been used to prevent routing loops. However, such methods require maintaining full paths information for every destination or require all nodes in the network share the same image of whole network topology leading to increased overhead of control messages.

SUMMARY

In light of the above, it would be desirable to provide a method or system for detecting loop occurrence while reducing the cost of loop prevention. The present invention addresses this need and provides related advantages as well.

In one aspect of the invention, a method for detecting communication loop in an ad hoc network is provided The method may comprise: receiving, at a node of the ad hoc network, a message comprising a commutative value, wherein the node is associated with a node identifier and the commutative value pertains to node identifiers associated with one or more nodes along a path the message has been traversed along regardless of the order of the nodes; and determining, with aid of one or more processors, presence of a loop based on whether the commutative value is identical to a previously obtained commutative value.

In some embodiments, the method further comprises extracting the commutative value from a predetermined field of the message. In some embodiments, the node functions as a broadcast node, relay node, or recipient node. In some embodiments, the message comprises a header portion and a payload portion. In some cases, at least one of the commutative value is included in the header portion. In some cases, the method further comprises dividing the payload portion into a plurality of fragments each of which comprises a content identifier and a commutative value. In some instances, the method further comprises computing an updated commutative value for each of the plurality of fragments individually. In some embodiments, the commutative value is obtained by performing a commutative operation to the node identifier and a previous commutative value of the message. In some embodiments, the commutative operation comprises at least one of addition, multiplication, and exclusive or (XOR). In some embodiments, the message further comprises a message identifier and the message identifier is uniquely associated with a source of the message.

In some embodiments, the method further comprises performing at least one of discarding, relaying, storing the message according to a predetermined reaction scheme after the node determines the presence of a loop. In some cases, the node supports multiple communication technologies.

In another aspect of the invention, a method for detecting a communication loop of an ad hoc network. The method comprises: receiving, at a node of the ad hoc network, a message comprising a plurality of sub-contents, wherein each sub-content comprises a commutative value, wherein the node is associated with a node identifier and the commutative value is pertained to node identifiers associated with one or more nodes along a path each of sub-contents has been traversed along regardless of the order of the nodes; and determining, with the aid of the one or more processors, presence of a loop for the plurality of sub-contents individually, based on whether the commutative value and is identical to a previously obtained commutative value.

In some embodiments, the method further comprises extracting the commutative value from a predetermined field of the message. In some embodiments, the node functions as a broadcast node, relay node, or recipient node. In some embodiments, the message comprises a message identifier associated with a source of the message. In some embodiments, the commutative operation comprises at least one of addition, multiplication, and exclusive or. In some embodiments, the method further comprises performing at least one of discarding, relaying, storing the sub-content according to a predetermined reaction scheme after the node determines the presence of a loop. In some embodiments, the node supports multiple communication technologies.

It shall be understood that different aspects of the invention can be appreciated individually, collectively, or in combination with each other. Various aspects of the invention described herein may be applied to any of the particular applications set forth below or for any other types of the network traffic management/security system disclosed herein. Any description herein concerning the network loop detection may apply to and be used for any other network loop detection situations. Additionally, any embodiments disclosed in the context of the network loop detection system are also applicable to the methods disclosed herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Methods and systems of the present disclosure are provided for detection of a loop or prevention of looping. Packet looping or routing loops may be detected at early stages by the provided method thus preventing network congestion or resource consumption. The provided methods and systems are capable of detecting loops with reduced cost. The methods and system of the present disclosure may be well suited for combination with many types of networks and many types of routing protocols where a looping occurs. In particular, the methods and systems can be well suited for detecting and preventing loops in wireless networks.

A wireless network can be substantially stationary or dynamic. Wireless networks can be infrastructure wireless networks that rely on fixed infrastructure such as cellular towers or access points to support wireless communication. Such type of networks may comprise nodes that may be stationary and the link connections may not change frequently. Wireless networks may be mobile ad hoc networks or mobile mesh networks that comprise a collection of nodes whose positions are continually changing. Thus, the topology of the network may change unpredictably.

The wireless networks may utilize any suitable communication technologies such as Bluetooth or Wi-Fi. It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

One important issue with mobile ad hoc network is to provide stable communication between nodes against transition of network state such as node mobility or quality transition of communication links. Many routing protocols have been developed and designed to improve network robustness and resilience against link failure or topology changes. Table-driven routing protocols are similar to the conventional routing approach, i.e., each node attempts to maintain consistent, up-to-date, routing information for all other nodes in the network. Examples of table driven routing protocols are Destination-Sequenced-Distance-Vector (DSDV), Clusterhead Gateway Switch Routing (CGSR), and the Wireless Routing Protocol (WRP) protocols. In another example, source initiated on-demand routing protocols create routing information only when a source node needs a route to a given destination. Examples of source initiated on-demand routing protocols include Ad-Hoc On-Demand Distance Vector (AODV), Dynamic Source Routing (DSR), and the Temporally Ordered Routing Algorithm (TORA). Due to the stochastic nature of wireless links, the communication paths may change frequently. In many cases, such path flapping behavior may raise the risk of looping.

Looping or routing loops are harmful problems because looping messages travel along the same link repeatedly and consume significant capacity of the network. The disclosed methods and systems may be applied to both wired and wireless networks where looping occurs. For example, in a wired network when a link fails, the link failure triggers the process of paths re-computation in routing protocols. Then, in the transient state to converge to the new shortest paths state, routing tables among some nodes possibly create loops temporarily. In another example, in wireless multi-hop networks with proactive link-state routing schemes such as Optimized Link State Routing protocol (OLSR), it is general to deploy a dynamic metric to improve the performance of networks and a frequent change of such dynamic metrics may cause routing loops.

The provided method and/or system may allow loop detection in a decentralized manner. In some cases, each node of a network may be capable of detecting presence of a loop. A node may be any device equipped with communication capabilities. The communications may be wired or wireless communications. The node may be operating over various technologies such as Global System for Mobile communication (GSM), Universal Mobile Telecommunications System (UMTS), High Speed Downlink Packet Access (HSDPA), Code Division Multiple Access (CDMA), Long Term Evolution (LTE), Worldwide Interoperability for Microwave Access (WiMAX) and infrastructure IEEE 802.11 variants, such as IEEE 802.11a/b/g/n/ac and various others. A node may be a Bluetooth or Wi-Fi enabled device, such as laptops, cellular phones, Personal Digital Assistant (PDA), Smartphone, HSDPA terminal, CSMA terminal and various other access terminals. A node can operate as a broadcast node, relay node, source node, sink node or recipient node in the network. A node may or may not be mobile. A node may be low power devices such as sensors or wearable devices.

Figure 1A:
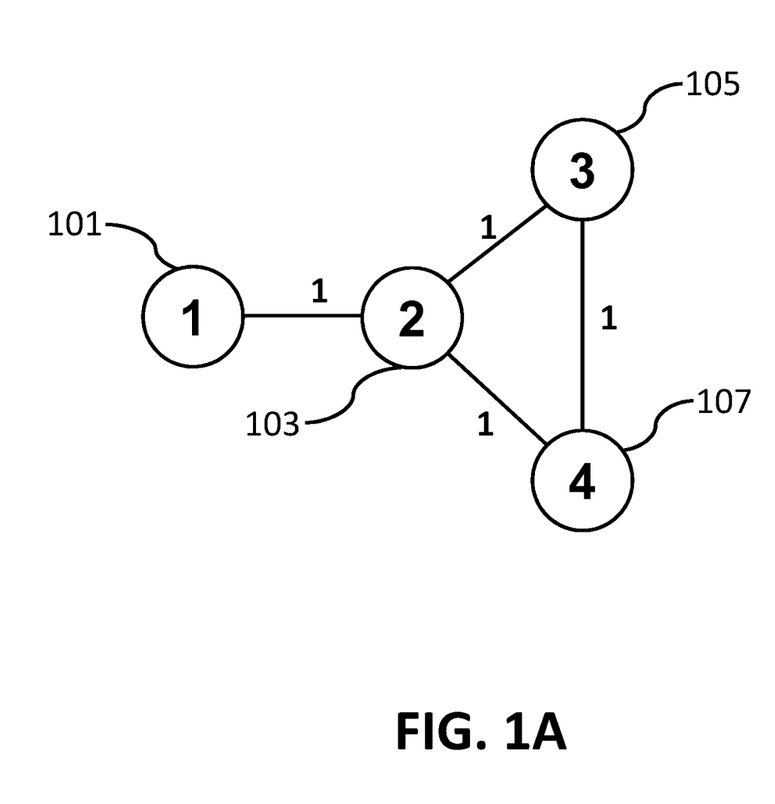
FIG. 1A illustrates an example of looping occurring in a network.
Figure 1B:
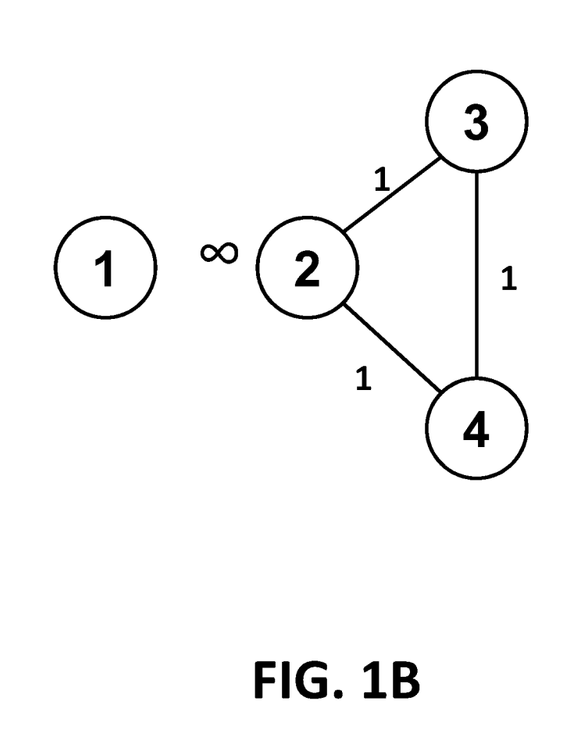
FIG. 1B illustrates an example of looping occurring in a network

FIG. 1A illustrates an example of a network and FIG. 1B shows an example of looping occurring in a network. As mentioned above, looping can be caused by various factors or in various situations. FIG. 1B shows a loop as a result of link failure. As illustrated in FIG. 1A, a network may comprise at least node 1 101, node 2 103, node 3 105, and node 4 107. In some cases, the network may be an ad hoc mobile network.

Any routing protocol may be employed in the network. For instance network traffic or packets transmission may conform to distance vector routing schemes or link-state routing scheme. In some instances, a node in the network may be aware of the presence of neighboring nodes with aid of control messages or other periodic updates. The control messages or updates may specify a destination and respective cost (e.g., hop count, link metrics, etc.). For instance, node 1 101 is the next hop of node 2 103 and the hop count between node 1 and node 2 is 1.

Loop may occur when a link fails. For example, when distance vector routing scheme is employed, each node may maintain a distance table in which the distance for each destination is held, and advertises the distance-table to every neighbor periodically. Each node has only to choose the neighbor that has the shortest distance for each destination to construct its routing table. However, when link failure occurs, the distance for a destination may increase repeatedly among involved nodes until reaching the maximum distance defined in the protocol. In this period of time, packets may be forwarded among involved nodes and loop among them. For instance, as illustrated in FIG. 1B, when the link between node 1 101 and node 2 103 fails, node 2 103 may change its route and use node 4 107 as the next hop instead of node 1. In the meantime, node 2 may update its routing table and advertise a route with an increased cost. Packets may be looped between node 2 103 and node 4 107 until a maximum or threshold number of hop counts is reached.

Other approaches such as path-vector routing or link-state routing may be employed to reduce loops. However, such approaches require exchange of more information among nodes, increasing the cost of control messages. Therefore, it is desirable to provide an approach to detect loop occurrence with low cost of the networks before a message is repeatedly forwarded among nodes multiple times.

In some embodiments of the invention, a loop may be detected using information related to a path that a message (e.g., packet) traversed along. In some cases, such information may pertain to one or more nodes along the path regardless of the order of the nodes. In some cases, such information may be represented by a value which may be generated based on one or more unique identifiers associated with the nodes respectively. The unique identifiers may also be used at the IP layer for routing computations. In preferred embodiments of the invention, the value may be computed by applying commutative operations to the unique identifiers. In some cases, such value may be included in a field (e.g., commutative field) of the message without requiring extra bandwidth. Upon receiving a message, a node may check and update the value in the commutative field of the message for detecting a loop.

A message may comprise a commutative value for identifying a path the message has traveled along. The path may comprise one or more nodes. In some embodiments, presence of a loop is determined when a message received by a node comprising a commutative value identical to a commutative value of a previous message received by the node with respect to the same source and/or destination.

The commutative value may be embedded in the message without requiring extra bandwidth or packets. The commutative value may be included in a field of a message. In some embodiments of the invention, the communication value may be a result of a commutative operation on a unique identifier associated with each of the one or more nodes. By performing a commutative operation, the commutative value would be the same regardless of the order of the one or more nodes. Commutative operations may be used to determine that if two messages comprise identical commutative value, the set of nodes that forward the messages are the same and a loop may likely occur. Examples of commutative operations may include, but not limited to, addition, multiplication, exclusive or (XOR), or any combination of the above without deviating from a commutative operation. The commutative value may comprise any number of bits such as 4 bits, 8 bits, 16 bits, 32 bits, 64 bits and the like.

Figure 2:
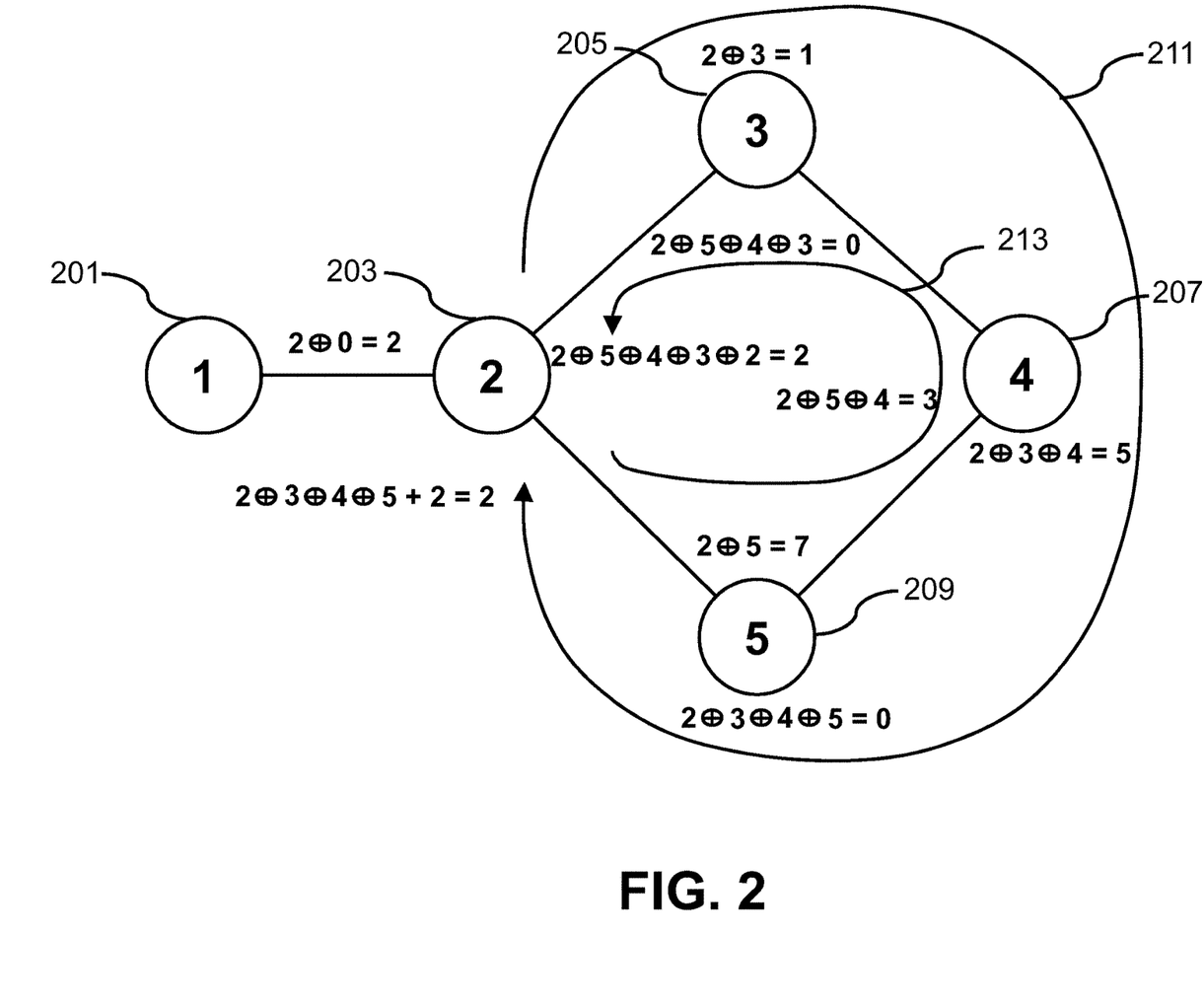
FIG. 2 illustrates an example of commutative operations performed by nodes in a network.

FIG. 2 illustrates an example of performing commutative operations by a plurality of nodes in a network. Commutative operations may comprise various types of operations such as addition, multiplication, XOR as described elsewhere herein. In some cases, commutative operations may be performed on the unique identifier (UID) associated with each node and a previous commutative value. In some cases, the commutative value may be result of one or more commutative operations of the same type or a combination of two or more commutative operations of different types. For example, a commutative operation performed by each node may be a single commutative operation (e.g., single XOR operation) or any commutative combination of two or more commutative operations that may or may not be the same type (e.g., combination of addition and multiplication).

A node unique identifier (UID) may uniquely identify a node in a network. A node UID may be generated in a centralized manner or distributed manner. The node UID may comprise any number of bits, such as 4 bits, 8 bits, 16 bits, 32 bits and the like as long as each node is uniquely associated with a node UID. The node UID may be Internet Protocol (IP) addresses, port addresses, link layer addresses, labels, or a combination of the above. The node UID may be assigned by a central system and may not necessarily have physical meanings.

As shown in FIG. 2, XOR is performed on the node UID. In the example, the node UID associated with each node is 1, 2, 3, 4, and 5, respectively. In the example, a new node 1 201 is added to the network. Messages may be generated and flooded throughout the network to broadcast the presence of the new node. Node 2 203 may create a new routing entry to node 1 in the routing table. In some cases, upon a newly established connection, the commutative field in a message forwarded to a neighbor node is set to the UID of the node that established the connection. In the example of using a XOR operation, the message at node 2 203 may comprise a commutative field which contains a commutative value of 2. Node 2 203 may forward a message to its neighbors node 3 205 and node 5 209 to update the presence of node 1. Upon receiving the message, node 3 205 performs XOR operation ($2\string^3$) to the commutative value in the commutative field and the node UID of node 3. Thus the commutative value is updated as $2\string^3=1$. Following the path 211, the message has been forwarded by node 3 205, node 4 207, node 5 209 and node 2 sequentially. Along the path, at each node, the commutative value has been updated as shown in the example. Similarly, along the other path 213, another copy of the message has been forwarded by node 5 209, node 4 207, node 3 205 and node 2 203 sequentially and the commutative field has been updated at each node accordingly.

Node 2 may detect two messages with identical commutative value after performing the commutative operation by node 2. The identical commutative value indicates the two messages traveled along two paths comprising the same set of nodes but in different orders. A loop has likely occurred upon determination of the identical commutative value.

The commutative field may be in any location of a message transmitted in the network. The message may comprise any protocol data unit or network data unit. The message may comprise a segment, a datagram, a packet, a frame and the like.

The message may comprise a commutative field and a message UID field. The message may be uniquely identified by the message UID. The message UID may be assigned according to a specific application and/or protocol. In some cases, an identical message UID may indicate identical message content. In some cases, an identical message UID may indicate that messages are transmitted from/to the same source ID/destination ID. The message UID may or may not be the same as the node UID. In some cases, the message UID may be different from the node UID however both the message UID and the node UID may uniquely associated with a source node. In some cases, the message may be fragmented or broken down into fragments according to a protocol such as to fit a maximum transmission unit size.

Figure 3:
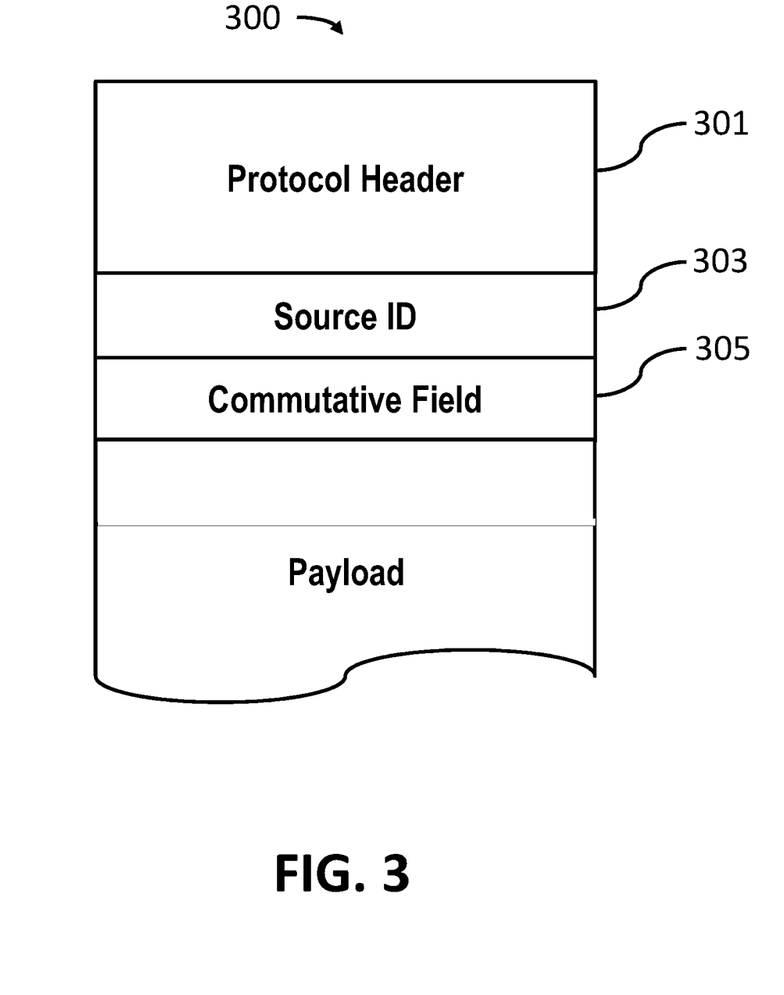
FIG. 3 shows an exemplary message with loop detection features, in accordance with embodiments of the invention.

FIG. 3 shows an exemplary embodiment of a message 300, in accordance with embodiments of the invention. In some cases, the message 300 may be a packet. The packet may have a header 301 which contains fields indicating the source and destination of the packet. For example, the packet may contain Internet Protocol (IP) addresses and the like. The header 301 may be formatted according to the protocol defined between the nodes. For example, when the mobile nodes communicate on the basis of TCP/IP, an IP header may be attached.

The message 300 may comprise a source ID 303. In some cases, the source ID along with a commutative value may be utilized to identify a loop occurrence. For example, when a message is determined to have an identical commutative value compared to a commutative value of a previous message, the source ID of the two messages may be compared to see whether these two messages are originated from the same source. Alternatively, the message may be checked to see whether the message UID is the same as a previously obtained message UID, and if the message UID matches, then the commutative value is compared with the commutative value of the previously obtained message. Further information may or may not be required to determine the presence of a loop.

The message 300 may comprise a commutative field 305. The commutative field 305 can be the same commutative field as described elsewhere herein. The commutative field 305 can be located anywhere in the message. For example, when the message comprises a header portion and payload portion, the commutative field may reside between the header and the payload, or can be included in the header. In some cases, the commutative field utilizes an existing field of the message such as Information Elements (IEs). In some cases, the commutative field is an additional field inserted into a message. The commutative field may have fixed length or variable length. The commutative field may comprise a length that is capable of storing a commutative value as described elsewhere herein.

Figure 4:
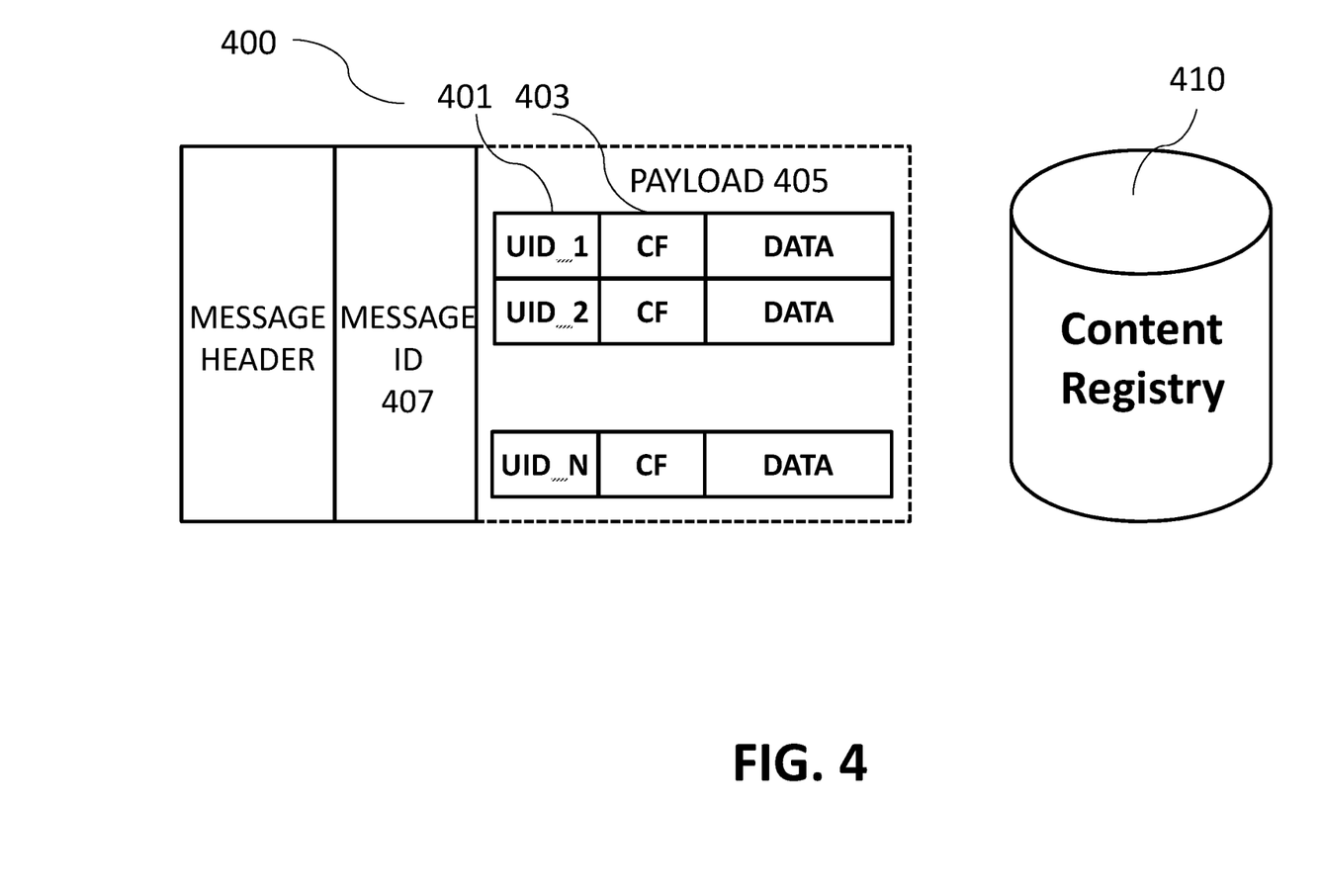
FIG. 4 shows an example of a message comprising a multiple sub-contents, in accordance with embodiments of the invention.

FIG. 4 shows another example of message 400 comprising a commutative field, in accordance with embodiments of the invention. As mentioned above, a message may, in some cases, comprise a header portion and a payload portion 405. The message may comprise a message UID 407 as described elsewhere herein. For example, the message UID may, in some cases, relate to the source of the message. In some cases, payload of a message may be fragmented into a plurality of sub-contents or sub-messages. In some cases, the message 400 may comprise a plurality of sub-contents each of which comprises a content UID 401 and a commutative field 403 (e.g., CF). The sub-contents may be appended to the message 400 as the message is forwarded among a plurality of nodes. In some cases, as the message 400 transmitted among the nodes, the number of sub-content hence the number of content UIDs and commutative fields may vary. For example, each sub-content may correspond to an entry in a routing table comprising routing information or metrics used in the routing protocol. When the message is received by a node, prior to forwarding it to the next node, an entry identified by a node UID may be added to the message. Each node may perform the commutative operations to each commutative field individually. The commutative operation result or the updated commutative value may be compared with the commutative value of the sub-content with the same content UID 401. In some cases, each node may buffer the message or the sub-contents in a content registry 410. A content registry may be any data storage structure capable of caching messages, routing information or bundles, such as a routing table or a Delay/Disruptive Tolerant Network (DTN) storage.

Figure 5:
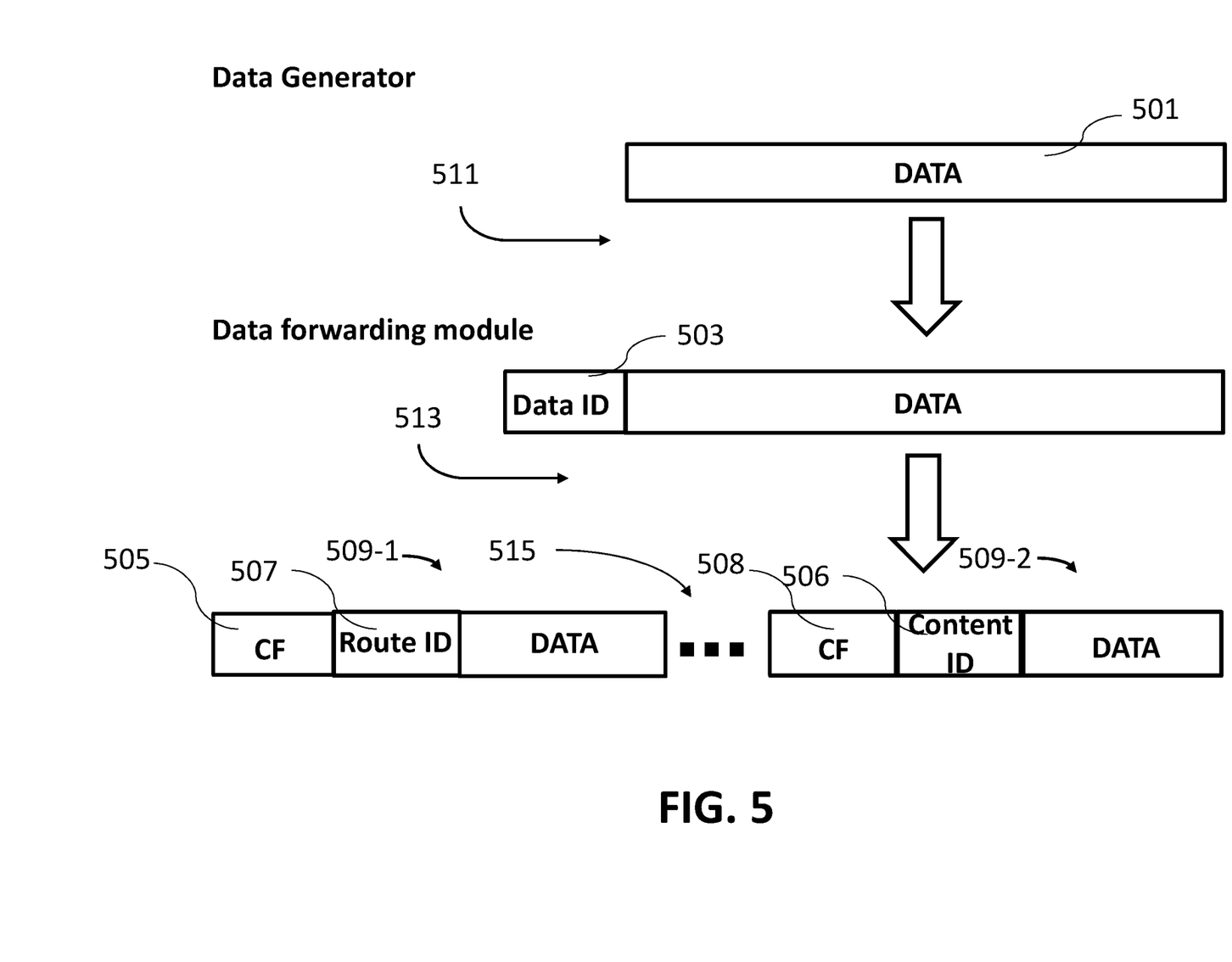
FIG. 5 shows an example of generating a message with loop detection features, in accordance with embodiments of the invention.

FIG. 5 shows an example of preparing a message with loop detection features. A message may comprise a portion of or the whole data content 501. In some embodiments, data content may be generated by a data generator 511 of a node in a network. The data generator 511 may be implemented by software, hardware or a combination of both. In some cases, the data generator may be a component of a wireless interface of a node (e.g., mobile device). For instance, the data generator may be implemented by the wireless interface card of a mobile device. Alternatively, the data generator may reside in any location of a node (e.g., mobile platform) and may be implemented by a separate component coupled to a network interface of the node communicatively. For example, the data generator can be implemented by host-based software/application.

In some cases, the data 501 may be padded with a data ID 503 by a data forwarding module 513. The data forwarding module 513 may be implemented by software, hardware or a combination of both. In some cases, the data forwarding module 513 may be a component of a wireless interface of a node (e.g., mobile device). For instance, the data forwarding module 513 may be implemented by the wireless interface card of a mobile device. Alternatively, the data forwarding module 513 may reside in any location of a node (e.g., mobile platform) and may be implemented by a separate component coupled to a network interface of the node communicatively. For example, the data forwarding module 513 can be implemented by host-based software/application, or a router application.

The data ID 503 may uniquely identify the data content. In some cases, the data content may be divided into a plurality of sub-contents. The data forwarding module 513 may be configured to further include a commutative field 505 to the data content to form a message 509-1, 509-2. The message can be formatted in various different ways as long as a commutative field 505, 508 and an identifier 506, 507 are included. The identifier can be inserted before or after the commutative field. In some cases, both or at least one of the identifier field and commutative field may be included in a header of the message 509-1, 509-2. Alternatively, the identifier field and the commutative field can be located in any portion of the message. As mentioned above, when the message contains a portion of the data content, a sequence of messages 509-1, 509-2 may collectively contain the whole data content 501.

As described above, the identifier may uniquely identify data content (e.g., content ID 506), a source identifier (e.g., route ID 507), a destination ID, a combination of the above or various others depending on a specific application or utility of the message. The content ID 506 can be the same as the content ID 401 as described in FIG. 4. The route ID 507 can be the same as the source ID 303 as described in FIG. 3. In some cases, the identifier may comprise a combination of a data content ID, a source ID or destination ID. The identifier may be included in one or more fields. In some cases, messages with the same identifier value may further be compared to detect an identical commutative value so as to determine a likelihood of a loop.

The message 509-1, 509-2 may comprise a commutative field 505, 508. The commutative field may comprise a commutative value that is processed by the node the message is forwarded along among. The commutative value may be used to identify one or more nodes in a path the message has been traveling along. Identical commutative value may indicate the message has been forwarded among the same set of nodes not necessary in the same order. A loop is likely to occur when a message received by a node comprising a commutative value identical to a commutative value of a previous message received by the node with respect to the same identifier (e.g., source ID, destination ID, content ID).

The commutative field may be processed by performing a commutative operation over the current commutative value and a node UID. The commutative operation has been described elsewhere herein. In some cases, the commutative field may be initialized with an initial commutative value. The initial commutative value may be set based on different applications. For example, when the message is a route reply packet used in a route discovery function (e.g., Dynamic Source Routing), the initial commutative value may be set as the same value of the final commutative value in the route request packet in order to determine whether the direction of propagation is outward from a source node to a destination node. In another example, when the message is transmitted in a unicast mode, the commutative value may be initialized as the node UID for detecting a duplicate message thereby to avoid multiple transmissions of the same message by an intermediate node that receives it through multiple paths.

Figure 6:
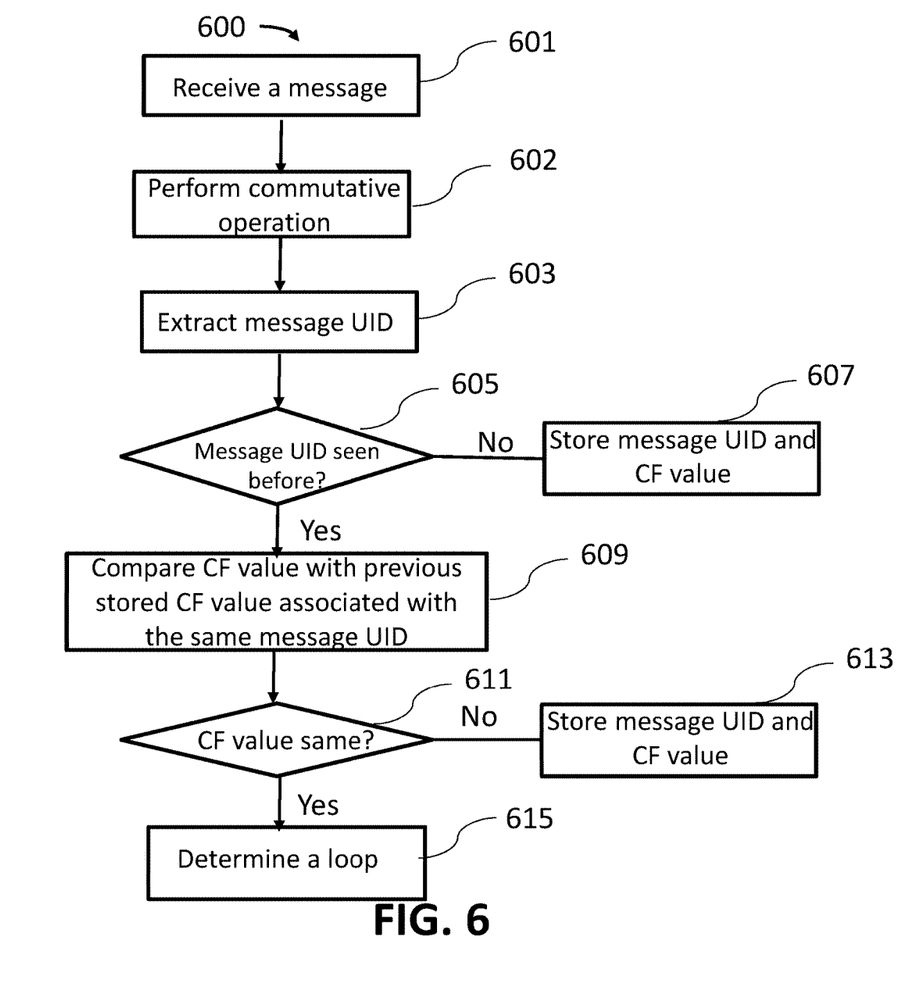
FIG. 6 schematically shows a process of detecting a loop, in accordance with embodiments of the invention.

FIG. 6 schematically shows a method 600 of detecting a loop, in accordance with embodiments of the invention. An occurrence of a loop may be detected by any node in a network such as source node, destination node or intermediate/relay node. The method 600 can be used in combination with any routing protocols, transport protocols, communication technologies, schemes or techniques. The method 600 can be used in various applications such as for detecting a duplicate message when a message is transmitted in unicast communication or for determining a propagation direction during route discovery.

Upon receiving a message 601, a commutative operation may be applied to the commutative field of the message 602. The commutative operation may be performed on the commutative value carried by the message and a node UID of the node that receives the message. The commutative value may be updated with the commutative operation result. The previous commutative value may or may not be stored. In some cases, the commutative value may be replaced by the current commutative operation result.

The message UID may be checked 603. The node may compare the message UID with a previously stored message UID for a match 605. The previously stored message UID may be the message UID received within a window. In some cases, the message UIDs within a recent time window may be tracked. The recent time window may be, for example, within the last 1 minute, 5 minutes, 10 minutes, 20 minutes, 1 hour, 24 hours, 48 hours and the like. Alternatively, the message UIDs received at a specific time point may be stored.

When the message UID does not match any previously stored message UID, the new message UID and/or associated commutative value may be stored in memory 607. The memory may be accessible by at least the node that receives the message or one or more processors that process the message. In some cases, other information associated with the message can also be stored in the memory. For example, a copy of the message or one or more node UIDs of the nodes that have forwarded the message may be stored in the memory as described in FIG. 4.

When the message UID matches a previously stored message UID, the commutative value contained in the commutative field may be compared against the previously stored commutative value associated with the matched message UID 609. If the commutative value is not identical to the previous stored commutative value, the message UID and associated commutative value may be stored in a memory 613. The memory may be accessible by at least the node that receives the message or one or more processors that process the message.

When the commutative value matches the previous stored commutative value associated with the same message UID, it may provide a likelihood that a loop has occurred 615 or an indication that the message and the previous message as received by the node are forwarded among the same set of nodes though in different orders. Depending on the specific application, these two messages may or may not be duplicate messages. In some cases, upon detection of an identical commutative value, further actions may be triggered according to a reaction scheme.

The reaction scheme may comprise, for example, generating a report message, drop a duplicate message, update a routing table, limit the bandwidth consumed by the message flow (i.e., rate-limit), log the message flow, "mark" the message for quality of service (QoS) (e.g., set a lower or higher priority for the message flow), redirect the message flow (e.g., to avoid critical paths), and various other actions. The reactive scheme may be determined based on a specific application. The reactive scheme may vary according to different network condition in real time. The reactive scheme may be predetermined.

In an example, upon detection of an identical commutative value with respect to the same message UID, a report message may be generated. The report message may be, for example, a notification or update packet that is broadcast to some or all of the nodes in the network. The report message may be generated by the node that detects the identical commutative value with respect to the same message UID. For instance, when Destination-Sequenced Distance-Vector Routing (DSDV) protocol is used where packets are routed between nodes of an ad hoc network using routing tables stored at each node, upon detection of a loop, the detecting node may broadcast the loop in the routing table update packets transmitted throughout the network.

In another example the method can be used in route discovery. For example when dynamic source routing (DSR) technique is used, during route discovery, a source node broadcasts a route request packet with a recorded source route listing only itself. Each node that hears the route request forwards the request (if appropriate), adding its own address to the recorded source route in the packet. The route request packet propagates hop-by-hop outward from the source node until either the destination node is found or until another node is found that can supply a route to the target. In some embodiments, the route request packet may comprise a message UID and a commutative field. A commutative value may be updated as the route request packet forwarded by the nodes. All source routes learned by a node are kept in a route cache. When a node receives a route request for which it has a route in its cache, it does not propagate the route request, but instead returns a route reply to the source node. The route reply contains the full concatenation of the recorded route from the source, and the cached route leading to the destination. If a route request packet reaches the destination node, the destination node returns a route reply packet to the source node with the full source to destination path listed. In some embodiments, the route reply packet may be configured to include a message UID and commutative field. The message UID of the route reply packet may be the same as message UID of the route request packet or share an identifier of the discovery process. An initial commutative value may be set as the commutative value carried by the route request packet as received by the destination node. In such scenario, when the source node receives the route reply packet, a mismatch between the commutative value carried by the route reply packet and the route request packet may indicate an error in route discovery.

Although FIG. 6 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. The method may also be modified in accordance with other aspects of the disclosure as provided herein. For example, operation 602 and operation 603 may switch the order.

The provided method may be implemented using software, hardware or a combination of both. The above-described methods according to the present invention can be realized as software or computer code (e.g., application programming interface (API), Software Development Kit (SDK), etc) that can be stored in a recording medium such as a CD ROM, a RAM, a floppy disk, a hard disk, or a magneto-optical disk or downloaded over a network, so that the methods described herein can be rendered in such software using one or more processors. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. It should be noted that the one or more processors may be component of a node in the network or operatively coupled to the node.

Methods according to the above-described examples can be implemented using computer-executable instructions that are stored or otherwise available from computer readable media. Such instructions can comprise, for example, instructions and data which cause or otherwise configure a general purpose computer, special purpose computer, SoC (System-on-a-Chip), chipset, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

The instructions, media for conveying such instructions, computing resources for executing them, and other structures for supporting such computing resources are means for providing the functions described in these disclosures.

Figure 7:
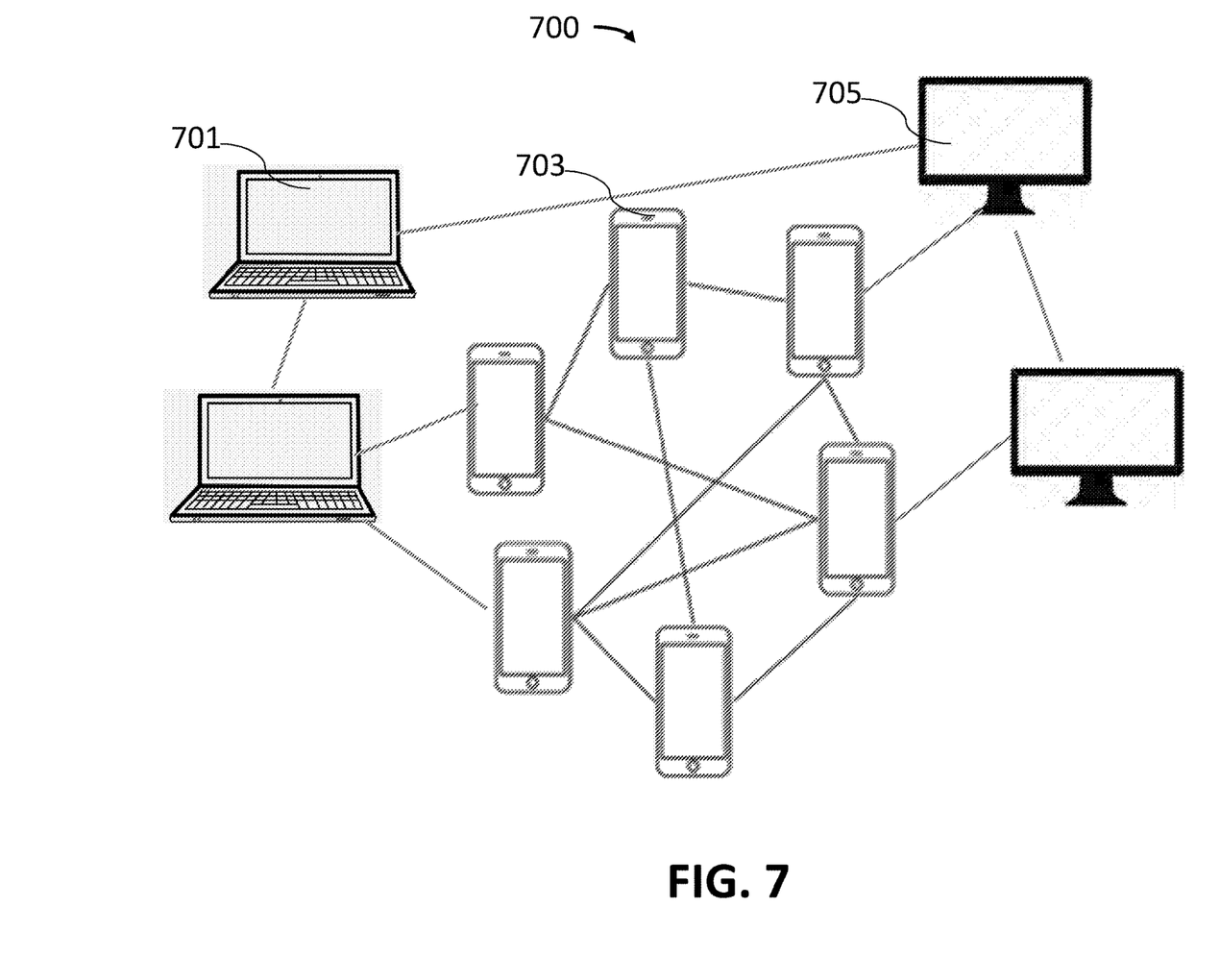
FIG. 7 shows an example of a network with loop detection, in accordance with embodiments of the invention.

FIG. 7 shows an example of a network 700 that may utilize the method and system provided herein to prevent looping. As mentioned above, the network 700 can be wireless network, wired network or a combination of both. The network 700 may be infrastructure wireless networks that rely on fixed infrastructure such as cellular towers or access points to support wireless communication. The network 700 networks may be mobile ad hoc networks or mobile mesh networks that comprise a collection of nodes whose positions are continually changing thus the topology of the network changes unpredictably. The wireless networks may utilize any suitable communication technologies such as Bluetooth, Wi-Fi, Ethernet or any combination of the above.

The network may have any topology. The network topology may or may not be dynamic. The network may use any one or more protocols. For example, when the network is a mesh network, any proactive, reactive or hybrid protocols can be utilized. In some cases, the network may enable commutations using a single protocol. In some cases, different protocols may be employed by the network. The loop detection method and system as provided herein can be well suited for any of the protocols.

The network may comprise a plurality of devices 701, 703,705. A device may be a node in the network. The device may be equipped with communication capabilities. Communications may be wired or wireless communications. The device may be operating over various technologies such as Global System for Mobile communication (GSM), Universal Mobile Telecommunications System (UMTS), High Speed Downlink Packet Access (HSDPA), Code Division Multiple Access (CDMA), Long Term Evolution (LTE), Worldwide Interoperability for Microwave Access (WiMAX) and infrastructure IEEE 802.11 variants, such as IEEE 802.11a/b/g/n/ac and various others. A device may be a Bluetooth or Wi-Fi enabled device, such as cellular phones, Personal Digital Assistant (PDA), Smartphone, High Speed Downlink Packet Access (HSDPA) terminal, Code Division Multiple Access terminal and various other access terminals. A device can operate as a broadcast node, relay node, source node, sink node or recipient node in the network. It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

The device 701,703,705 may be mobile device (e.g., smartphone, tablet, pager, personal digital assistant (PDA)), a computer (e.g., laptop computer, desktop computer, server, a communication terminal, vehicle, electronic appliances, or any other type of device. The device may optionally be portable. A device may or may not be mobile.

The device 701,703,705 may include one or more memory storage units, one or more processors, and one or more communication units. The device may comprise one or more memory storage units which may comprise non-transitory computer readable medium comprising code, logic, or instructions for performing one or more steps. The device may comprise one or more processors capable of executing one or more steps, for instance in accordance with the non-transitory computer readable media. The one or more memory storage units may store one or more software applications or commands relating to the software applications. The one or more processors may, individually or collectively, execute steps of the software application. In some embodiments, the software applications or commands are implementing the loop detection method and/or other steps as described herein. Alternatively, the software applications or commands that implementing the loop detection method and/or other steps may be executed by on one or more separate processors that are operatively coupled to the one or more devices in the network.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for detecting a communication loop of an ad hoc network comprising:
    receiving, at a node of the ad hoc network, a message comprising a commutative value, wherein the node is associated with a node identifier and the commutative value pertains to node identifiers associated with one or more nodes along a path the message has been traversed along regardless of the order of the nodes; and
    determining, with aid of one or more processors, presence of the communication loop based on whether the commutative value is identical to a previously obtained commutative value.

2. The method of claim 1, further comprising extracting the commutative value from a predetermined field of the message.

3. The method of claim 1, wherein the node functions as a broadcast node, relay node, or recipient node.

4. The method of claim 1, wherein the message comprises a header portion and a payload portion.

5. The method of claim 4, wherein at least one of the commutative value is included in the header portion.

6. The method of claim 4, further comprising dividing the payload portion into a plurality of fragments each of which comprises a content identifier and a commutative value.

7. The method of claim 6, further comprising computing an updated commutative value for each of the plurality of fragments individually.

8. The method of claim 1, wherein the commutative value is obtained by performing a commutative operation to the node identifier and a previous commutative value of the message.

9. The method of claim 1, wherein the commutative operation comprises at least one of addition, multiplication, and exclusive or (XOR).

10. The method of claim 1, wherein the message further comprises a message identifier.

11. The method of claim 10, wherein the message identifier is uniquely associated with a source of the message.

12. The method of claim 1, further comprising performing at least one of discarding, relaying, storing the message according to a predetermined reaction scheme after the node determines the presence of a loop.

13. The method of claim 1, wherein the node supports multiple communication technologies.

14. A method for detecting a communication loop of an ad hoc network comprising:
    receiving, at a node of the ad hoc network, a message comprising a plurality of sub-contents, wherein each sub-content comprises a commutative value, wherein the node is associated with a node identifier and the commutative value is pertained to node identifiers associated with one or more nodes along a path each of sub-contents has been traversed along regardless of the order of the nodes; and
    determining, with the aid of the one or more processors, presence of a loop for the plurality of sub-contents individually, based on whether the commutative value and is identical to a previously obtained commutative value.

15. The method of claim 14, further comprising extracting the commutative value from a predetermined field of the message.

16. The method of claim 14, wherein the node functions as a broadcast node, relay node, or recipient node.

17. The method of claim 14, wherein the message comprises a message identifier associated with a source of the message.

18. The method of claim 14, wherein the commutative operation comprises at least one of addition, multiplication, and exclusive or.

19. The method of claim 14, further comprising performing at least one of discarding, relaying, storing the sub-content according to a predetermined reaction scheme after the node determines the presence of a loop.

20. The method of claim 14, wherein the node supports multiple communication technologies.

* * * * *